Patented Jan. 17, 1939

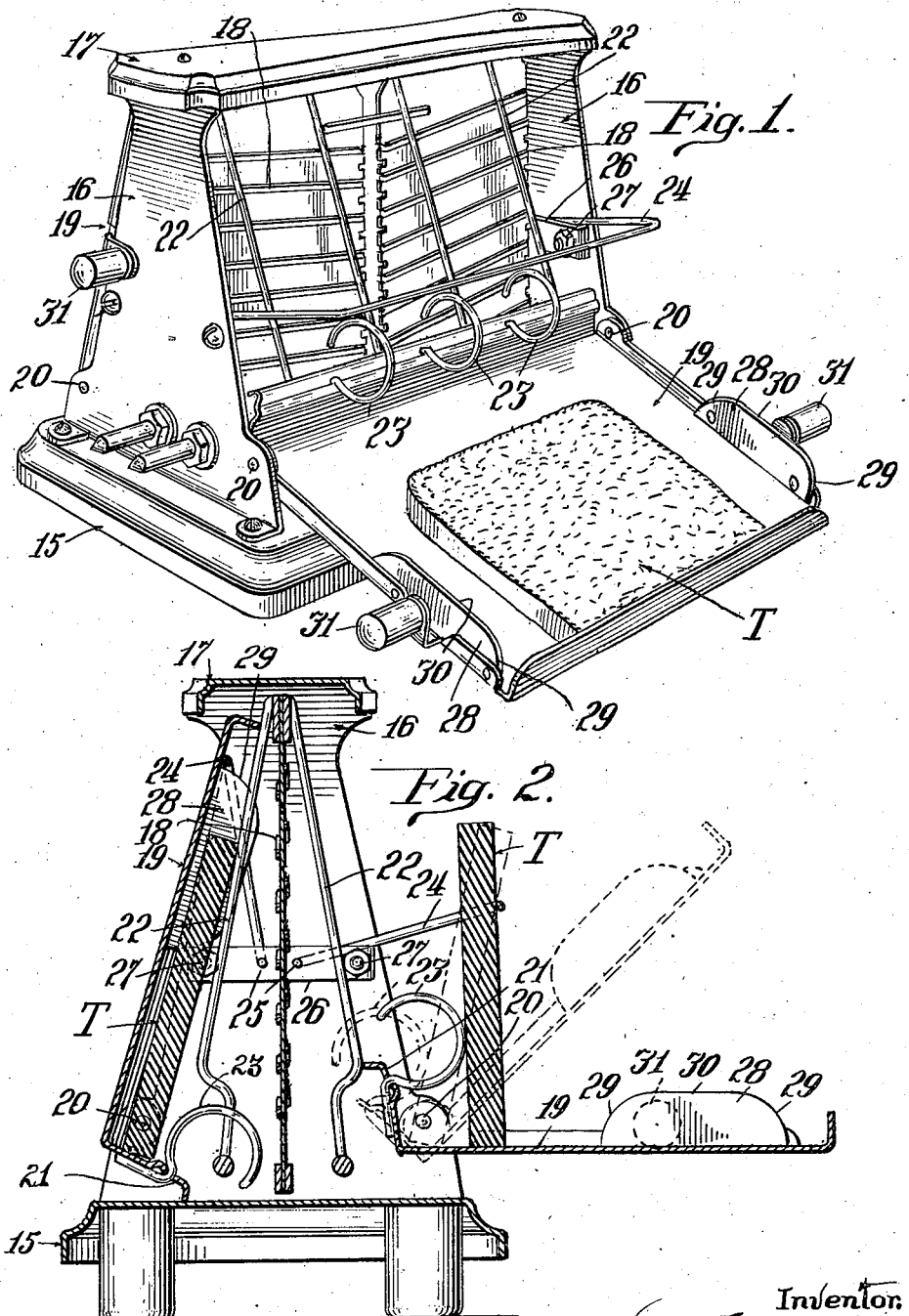

2,144,485

UNITED STATES PATENT OFFICE 2,144,485

TOASTER

Victor Emanuel, Chicago, Ill., assignor of one-half to Frank J. Cullomer, Chicago, Ill.

Application July 6, 1937, Serial No. 152,130

10 Claims. (Cl. 53—5)

My invention relates to a bread toaster, whether of a single or multiple type, wherein the heating element is preferably vertically arranged and provided with a suitable grill whereby the bread is held in slight spaced relation with the heating element; the slice of bread being supported on end against the vertically inclined grill by an extension or flange at the lower pivoted end of the cover or door which constitutes the side wall of the toaster. Toasters of the type mentioned and to which my invention is especially applicable are provided with a cover or door on opposite sides thus permitting two pieces of bread to be toasted at the same time and these doors are pivoted at their lower ends and incline inwardly at the top, thus holding the pieces of bread in an inclining manner.

My invention has for its object the provision of means whereby inspection of the grill contacting or toasting side of the bread may be had through the automatic operation of means whereby an outward tilting of the upper end of the piece of bread is produced by a predetermined degree of operation or opening of the side door sufficient to enable a proper inspection of the entire inwardly facing side of the bread.

The invention also has for its object the provision of means whereby the inspection position of the toasting bread as well as the delivery, toasted side downwardly, of the bread are automatically accomplished by the single operation or opening of the door; the normal position of said means being automatically restored by returning the door to closed position.

My invention contemplates control or movement of the bread without the necessity of touching the hot bread before complete toasting of the normally invisible side or of both sides of the bread has been accomplished.

My invention also has for its object the provision of a structure inexpensive in manufacture and constantly positive in operation; the aforementioned objects, as well as others, and the advantages of my invention will be readily comprehended from the following detailed description of the accompanying drawing, wherein—

Figure 1 is a perspective view of my improved toaster with one side door in complete open position.

Figure 2 is a vertical sectional view with one side door closed and showing a piece of bread in toasting position, while the other side door is partly open and illustrating a piece of toast in inspection position in dotted lines; while the full line position shows the toast at the initial point of sliding on the door to drop with the inner toasted side of the toast downwardly.

The invention contemplates means which will enable proper inspection of the toasting side of the bread to be had and which will also ensure proper delivery of the toast for use or for return of the reversed piece of bread to toasting position; the inspecting position of the toast being obtained without complete opening of the door and hence without undesirable cooling of the heating element.

My invention is especially adapted for use with a well known type of toaster provided with a suitable base 15, two end walls 16, 16, which taper upwardly connected to the top 17, a suitable heating element 18 vertically arranged between the top and bottom, substantially at the vertical median line, and two sides 19, 19 which are pivotally secured at 20 to swing downwardly outward and below the pivot points 20 as shown. The lower ends of the doors 19 are flanged at 21 beyond the pivots 20 and these flanges are arranged substantially at right angles to the doors; the pivotal points 20 being so positioned relative to the grills 22 that the flanges 21 will not contact the grills when the doors are swung upwardly into complete closed position.

The flange portion 21, at suitably spaced points, is shown provided with a number of loops or rings 23, which are fixedly secured to the flange 21 in any suitable manner, as by welding, and are disposed in a direction transversely and toward the forward or outer side of the flange 21 when the door is in open position. The loops 23 are secured adjacent the free longitudinal edge of the flange so as to be disposed above the main portion of the flange, as more clearly seen in Figure 1 and thus permit the lower edge of the piece of bread or toast to rest on the main part of the flange and be disposed between the loops and the door proper as shown at the left in Figure 2.

With this construction it is apparent that when the doors are moved to open position the loops 23 will contact the toast somewhat above the lower edge thereof and thus cause the upper part of the piece of toast to tilt forwardly or outwardly before the door is in complete open position. These loops are so spaced on the flange portion of the door that they will extend between the vertically arranged grill 22, but will not contact the heating element 18.

I provide a toast holding element 24 at a suitable point intermediate of the lower pivoted end of the door and the top of the toaster. This element 24, in the particular exemplification of the invention, is in the form of a wire loop whose ends are bent at right angles to the main portion and are pivotally supported on the end walls 16, 16 of the casing as at 25, see Figure 2; the pivotal points being adjacent the vertical median line of the casing.

In the drawing, the ends of the wire loop 24 are pivotally mounted in the cross-bars 26 which extend transversely of the end walls 16 of the casing and in slight spaced relation therewith and the ends of the wire loop 24 extend between the cross-bars 26 and the casing end walls 16. The ends of the cross-bars 26 are suitably secured at 27 to the casing end walls 16 and thus also provide stops or supports for the wire-loop 24 when the latter swings outwardly into the substantially horizontal position shown at the right in Figures 1 and 2. That is to say, the attaching points 27 of the cross-bars 26 will prevent the element 24 dropping down beyond the position shown in the drawing and thus will support the piece of toast (shown at T) on end and at a slightly outward inclination toward the top, as shown in dotted lines in Figure 2, to enable inspection of the inner or toasting side thereof.

As is apparent from Figure 1, the wire-loop 24 extends across the grill 22 of the toaster and will contact with the upper part of the grill 22 when the doors are closed, at which time the wire-loop 24 will be disposed upwardly and be located above the piece of toast, as shown to the left in Figure 2.

It is to be noted that the grills 22 limit the inward swing of the elements 24, causing them to be held at a slight inclination because the pivotal points 25 are located adjacent the vertical median line of the casing. As a result of this arrangement, the elements 24 will drop or swing outwardly through the action of gravity as soon as the doors are opened; in fact, the elements follow the doors in their opening movement, with the result that the elements 24 will be positioned between the doors and the upper ends of the toast before the loop elements 23 come into engagement with the toast and cause the latter to tilt outwardly into the toast inspecting position indicated to the right in Figure 2 in dotted lines.

The doors 19, preferably at both sides, are provided with flanges 28, 28 of predetermined dimensions and arranged slightly beneath the upper or free ends of the doors so as to engage and control the elements 24 throughout their outward swinging movement; the flanges 28 being provided with sloping or arcuate ends 29 for guiding the elements 24 to cause the latter to ride freely thereon. The flanges 28 are arranged on the doors so as to extend into the path of the intermediate or main portion of the loop elements and are of sufficient length to extend beneath the plane of the elements 24 when the latter have swung into the maximum outward position shown in Figure 1 in order that the longitudinal edges 30 of the flanges may engage the element 24 when the door is moved from open position to closed position and thereby force the loop element upwardly without having it contact the bread or piece of toast T carried by the door as shown in Figure 1.

In operation, the doors 19 are completely opened, as shown in Figure 1, and the pieces of bread placed thereon; the doors are then swung upwardly into closed position causing the bread to rest on the ledge or flange 21 of each door intermediate of the loop elements 23 and the door proper. In closing the doors the flanges 28 on the doors will force the elements 24 upwardly into the position shown to the left in Figure 2. In order to inspect or ascertain the condition of the toast, the users grasp the finger grasping portions or lobes 31 and move the door partially outward into the position shown in dotted lines to the right in Figure 2, at which time the element 24 will also be swung outwardly where it is in position to hold the upper end of the toast before the loop elements 23 come into contact with the toast and cause the latter to be tilted into the position shown in dotted lines. This enables the user to easily see the inner face or toasting side of the toast. If it has been insufficiently toasted then the door is again moved to closed position which causes the flanges 28 on the door to force the element 24 upwardly without subjecting the toast to any contact or pressure. If the bread has been sufficiently toasted then the user swings the door downwardly to the complete open position indicated in Figure 1 where the free end of the door is in a lower plane than its pivoted end. During this further outward swing of the door the loop elements 23 will cause the lower end of the toast to move outwardly while the element 24 supports the upper end of the toast as shown in full lines to the right in Figure 2 which indicates the position of the toast just prior to the sliding movement of the lower end of the toast and just prior to the further lowering of the door into the position shown in Figure 1, at which time the lower end of the toast will slide toward the free end of the door and thus cause the toasted side to drop downwardly. The door, with the untoasted side of the bread facing outwardly, is then closed and the movement of the respective elements and the action is as has been heretofore described. The elements 23 are preferably formed of wire as shown instead of consisting of strips of the same metal as the doors because the strips would be too wide and thus leave comparatively large untoasted surfaces. It is apparent from the foregoing description and the construction as shown that the loop elements 23 perform two functions; first they tilt the toasting bread outwardly at the upper end to permit inspection and then force the lower end of the toast outwardly beyond the vertical plane of the free end of the element 24 so as to induce the lower end of the toast to slide on the door and cause an overturning or reversing of the toast.

The structure shown and described is a simple and positively acting embodiment of the invention, but certain modifications are possible and may be made without, however, departing from the spirit of my invention.

What I claim is:

1. In a toaster of the character described provided with a vertically swinging door pivotally secured at its lower end; means, associated with the door, adapted to contact the inner toasting side of the toast when the door moves to open position so as to cause the upper end of the toast to tilt outwardly; and means pivotally secured to the end walls of the toaster so as to automatically swing downwardly into toast holding position, in advance of contact between the first mentioned means and the toast, to hold the toast at an outward inclination when the door moves into open position.

2. In a toaster of the character described provided with a door pivotally secured at its lower end to swing vertically downward into open position, the lower pivoted end of the door being adapted to support the toast in vertical position during toasting operation; means, associated with the lower part of the door, adapted to contact the inner toasting side of the toast above the lower end thereof, when the door moves to open position; and gravity actuated toast holding means adapted to swing intermediate of the toast and the door when the door moves into open position, in advance of contact of the first mentioned means with the toast, so as to hold the toast at an outward inclination.

3. In a toaster of the character described provided with an upright casing, a vertically arranged heating element intermediate opposite sides of the casing and vertically swinging doors at opposite sides of the casing and pivoted adjacent their lower ends so the upper ends swing outwardly, the lower ends of the doors being disposed inwardly to provide a toast supporting ledge; means associated with the lower ends of the doors adapted to move into contact with the toast above the lower end thereof after the doors have moved outwardly a predetermined degree; and gravity actuated means pivotally secured to the casing to swing outwardly when the doors are moved to open position adapted to support the toast in an outwardly inclining position before the doors move to complete open position.

4. In a toaster of the character described having an upright casing with vertically swinging doors at opposite sides, the doors being pivoted adjacent their lower ends so their upper ends swing outwardly, the lower ends of the doors being formed to provide toast supporting ledges; means secured to said ledges adapted to contact the toast above the lower edges thereof after the doors have opened a predetermined extent; gravity actuated elements pivotally secured to the casing, adapted to swing into the path of the toast before the first mentioned means contacts with the toast; and means carried by the doors whereby the elements are moved upwardly when the doors move to closed position.

5. In a toaster of the character described having an upright casing with a vertically swinging door; means adjacent the pivoted end of the door adapted to support the toast on end position and to also contact the toast to tilt the upper end thereof outwardly when the door is opened to a predetermined extent; and means adapted to move into toast holding position during opening movement of the door so as to hold the toast in tilted position.

6. In a toaster of the character described having an upright casing with an outwardly swinging door pivoted at its lower end; means associated with the lower end of the door for supporting the toast on end and movable with the door to tilt the toast outwardly during a predetermined movement of the door; and means pivotally secured to the casing to automatically move into toast-holding position intermediate of the toast and the door during initial movement of the door, the return to normal position of said means being induced by movement of the door to closed position.

7. In a toaster of the character described having an upright casing with outwardly swinging doors pivoted at the lower ends; means associated with the lower ends of the door for supporting the toast on end and to induce outward tilting of the toast at a predetermined moment in the opening movement of the doors; gravity controlled loops pivotally secured to the casing to swing outwardly during the opening movement of the doors adapted to hold the upper end of the toast in tilted position; and stop means for holding the loops in toast-holding position.

8. In a toaster of the character described having an upright casing and doors pivoted at their lower ends to swing outwardly; means associated with the pivoted ends of the doors for supporting the toast on end and to tilt the toast outwardly when the doors have reached a predetermined point in their opening movement; loops pivotally secured to the casing adapted to drop into toast-holding position during the opening movement of the doors; stop means for holding the loops in toast-holding position; and means carried by the doors for moving said loops into inoperative position during closing movement of the doors.

9. In a toaster of the character described having an upright casing with outwardly swinging doors pivoted at their lower ends; arcuate toast-engaging elements associated with the pivoted ends of the doors for engaging the inner or toasting side of the toast to tilt the upper end of the toast outwardly when the doors have reached a predetermined point in their outward movements; means associated with the casing for holding the upper end of the toast in tilted position, said means moving into toast-holding position simultaneously with the opening movement of the doors; and means associated with the doors for returning said last mentioned means to normal position during the closing movement of the doors.

10. In a toaster of the character described having an upright casing with an outwardly swinging door pivoted at the lower end; automatically operable means adapted to swing between the toast and the door and engage the upper part of the toast for holding the toast at an inclination for inspection, said means being controlled by the door; and means associated with the lower end of the door adapted to tilt the upper end of the toast outwardly into contact with said first means at a predetermined moment in the opening movement of the door and to force the lower end of the toast outwardly beyond the vertical plane of the upper end thereof during the further opening movement of the door beyond said predetermined moment.

VICTOR EMANUEL.